July 21, 1964 H. S. VAN BUREN, JR 3,141,209
MOLDING ASSEMBLY
Filed Aug. 3, 1961

Inventor:
Harold S. van Buren Jr.,
by Walter S. Jones
Atty.

United States Patent Office 3,141,209
Patented July 21, 1964

3,141,209
MOLDING ASSEMBLY
Harold S. van Buren, Jr., 54 Boylston St., Cambridge, Mass.
Filed Aug. 3, 1961, Ser. No. 129,059
1 Claim. (Cl. 24—73)

The invention is directed to an improved fastener member for attaching a metal molding to a metal support.

An object of the invention is to provide an improved fastener that is simple in construction, easy to use, and provides for effective insulation of a metal molding from a metal support to prevent corrosion of the metal members when assembled.

A further object of the invention is to provide a fastener member of molded plastic material to prevent corrosion of metals, reduce noise from vibration, be easily applied in a metal molding and have a flange that will provide effective insulation in various positions of the fastener relative to the metal molding.

Another object is to provide means for preventing the fastener from being accidentally depressed out of position into a deep molding.

Another object of the invention is to provide an effective seal against the passage of moisture or dust into the interior of a support to which a molding is to be attached in insulating position.

Figure 1:
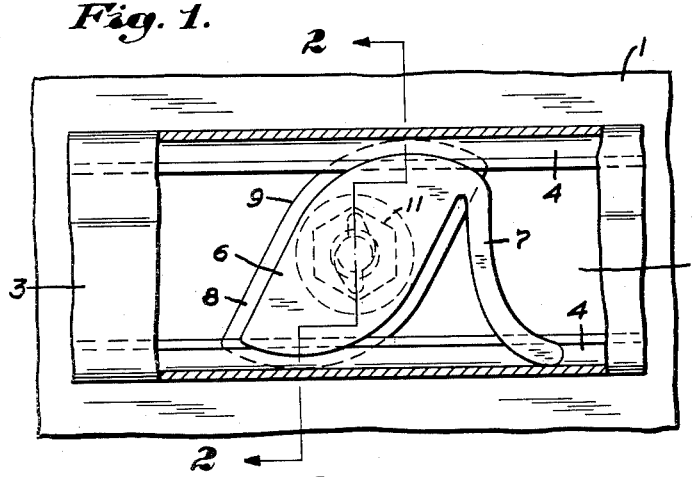
FIG. 1 is a plan view, partially in section, of a preferred form of installation including the improved fastener member.

With reference to the fastener member disclosed in the drawings, there is illustrated a device particularly useful in connection with attaching metal moldings to metal bodies and to metal supports, such as used in connection with trimming automobile bodies. The fastener member is preferably formed as a one-piece molded fastener member that is particularly useful in connection with metal moldings and supports because it has a flexible flange means or skirt which acts to insulate one metal part from another.

Heretofore, one-piece molded plastic fastener members for use with moldings have been known; but the provision of a suitable flange or skirt as a part of the fastener member to automatically insulate opposed metal members is believed to be new.

Figure 2:
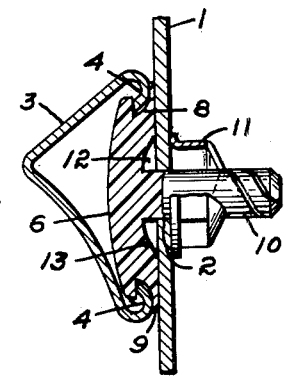
FIG. 2 is a section taken on the line 2—2 of FIG. 1.
Figure 3:
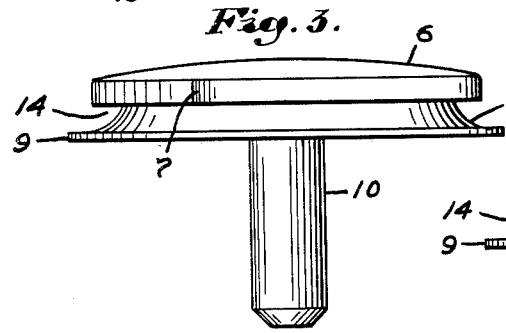
FIG. 3 is an enlarged side edge view of the fastener member, per se, looking at the side facing the yieldable finger.
Figure 4:
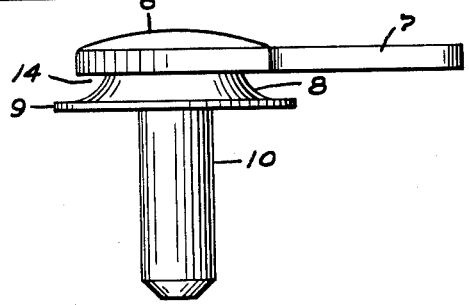
FIG. 4 is an end edge view of the fastener shown in FIGS. 1 and 3.
Figure 5:
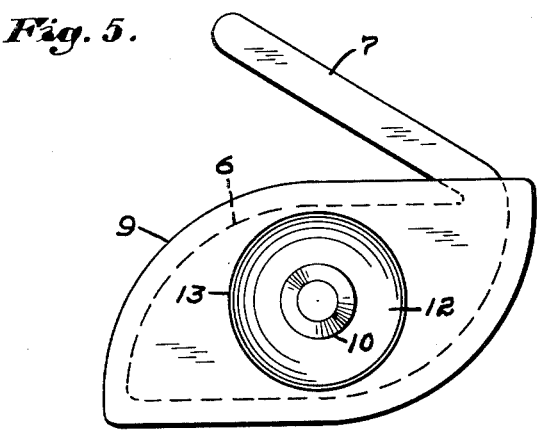
FIG. 5 is a bottom plan view of the fastener showing the normal position of the flexible finger.

In the particular installation selected for illustration, by FIGS. 1 and 2 of the drawings, there is shown a support 1 of sheet metal having an aperture 2, a metal hollow molding 3, and inwardly turned flanges 4 on the underside of the molding defining a longitudinal opening 5, as shown in FIG. 1. The installation also includes the novel fastening member preferably formed from injection molded plastic and having a molding engaging base portion 6, a yieldable finger 7 extending from said base 6, and a flexible flange means 8, in the form of a hollow truncated cane, extending from beneath said base and flaring outwardly (FIGS. 3 and 4) to provide a thin insulating skirt 9 at the edge. The base portion 6 is of elongated shape so that it may be inserted into the molding 3 through the slot 5 from the underside of the molding and the yieldable finger will press against an inner surface of the molding (FIG. 1) to rotate the base portion 6 to a crosswise position relative to the opening 5. The flexible flange means 8 of the fastener member is substantially the same shape as the base portion 6 (FIGS. 1 and 5) so that the thin skirt portion 9 will underlie the flanges 4—4 of the molding 3 and space it slightly from the support 1 (FIG. 2) for insulated separation of the molding 3 from the support 1.

The fastener and molding may be secured in position upon the support 1 by any suitable means. However, I have illustrated the fastener as being provided with a shank 10 extending from the underside thereof through the aperture 2 (FIG. 2) and engaged by a self-threading nut 11. This is one simple means of holding the parts together.

Since the molding 3 will be spaced slightly from the support 1, it would be relatively easy for moisture and dirt to pass between them and through the apertures 2 into the inside of the body or support 1, thereby causing damage to upholstery or any any other materials within the body, which may be a motor vehicle body. To overcome this, the flange portion 8 of the fastener has a recess 12, of any suitable shape, adjacent to where the shank 10 joins the flange 8, thereby providing an annular edge 13 (FIGS. 2 and 5) which will press tightly against the support around the aperture 2 when the installation is complete. This annular edge 13 will, therefore, prevent passage of moisture and dust through any of the apertures 2 provided in the support 1.

Since a continuous groove 14 is provided by the shape of the flange 8 underneath the base portion 6, the inturned flange portions 4—4 of the molding 3 will readily fit into this continuous groove regardless of the position of the base portion to the molding 3 when attached thereto. Thus a single size and shape of fastener member will adapt itself to various widths of moldings and even to varying widths in a single molding and automatically provide the insulation between the molding and its support by the skirt portion 9. Furthermore, the flange 8 is of such strength between the thin edge 9 and the base portion (FIG. 2), that the fastener cannot be pushed accidentally into the molding to release the flanges 4—4 from the groove 14. An example would be in the nature of pressing the end of the shank 10 against the support 1 when trying to find the aperture 2. Another example would be pressing a snap fastener stud into an aperture 2 when the shank 10 is in the form of a snap fastener stud (not shown).

While there has been illustrated and described a preferred embodiment of a new fastener, and one use of that fastener in a particular installation, it should be understood that the invention is best defined by the following claim.

I claim:

A molding assembly comprising, in combination, a hollow molding of metal having a longitudinal opening at its underside and inturned flanges at opposite sides of the longitudinal opening, a support for the molding also of metal, a fastener unit holding the molding to the support, and means of holding the fastener unit to the support, said fastener unit having an elongated base of synthetic molded plastic material spanning the longitudinal opening and engaging the opposed inturned flanges, and said fastener unit having a flexible flange means in the form of a truncated cone and the outer periphery thereof providing an insulating skirt integral with the elongated base and extending in spaced relation to said base beyond the periphery of said base, entirely around the periphery of said base and extending between said hollow molding and said support thereby insulating said molding from said support in any position of the elongated base relative to the support to prevent corrosion and to provide a seal.

References Cited in the file of this patent

UNITED STATES PATENTS

| | | |
|---|---|---|
| 2,695,434 | Bedford | Nov. 30, 1954 |
| 2,784,471 | Bedford | Mar. 12, 1957 |
| 2,983,008 | Von Rath | May 9, 1961 |
| 2,984,877 | Perrochat | May 23, 1961 |
| 3,000,066 | Cochran | Sept. 19, 1961 |
| 3,063,114 | Perrochat | Nov. 13, 1962 |

FOREIGN PATENTS

| | | |
|---|---|---|
| 788,742 | Great Britain | Jan. 8, 1958 |
| 1,176,696 | France | Nov. 24, 1958 |
| 1,205,039 | France | Aug. 10, 1959 |